March 26, 1940. A. C. FUHRMAN 2,194,975
FLOATING WHEEL
Filed Oct. 8, 1938 2 Sheets-Sheet 1

Inventor
Albert C. Fuhrman
By J. Stanley Burch
Attorney

March 26, 1940.  A. C. FUHRMAN  2,194,975
FLOATING WHEEL
Filed Oct. 8, 1938   2 Sheets-Sheet 2

Inventor
Albert C. Fuhrman,
By Stanley Burch
Attorney

Patented Mar. 26, 1940

2,194,975

UNITED STATES PATENT OFFICE 2,194,975

FLOATING WHEEL

Albert C. Fuhrman, Canton, Ohio

Application October 8, 1938, Serial No. 233,991

8 Claims. (Cl. 301—1)

This invention relates to floating vehicle wheels of the so-called "automatic camber type," wherein the wheel assembly is so mounted upon its supporting axle as to permit limited swinging movement of the assembly in a vertical plane transverse to the plane of the assembly, whereby the wheel assembly may at all times lie in a plane normal to the surface of the road. The purpose and advantages of a wheel of this type are well known and appreciated in the art and require no detailed explanation herein.

Heretofore, in wheel constructions of the present kind, the wheel assembly has been mounted so as to swing about a pivot located at a point, such as at a point coincident with the axis of rotation of the wheel assembly, which necessitated lateral skidding or sliding of the tire tread or treads of the wheel assembly relative to the ground surface, in the operation or use of the vehicle wheel. Obviously, due to the frictional contact of the tire or tires of the wheel assembly with the road surface, they will not ordinarily readily skid or slide laterally relative to said road surface, and faulty operation is had. In addition, as the lateral skidding or shifting of the tread surfaces of the tire or tires relative to the road surface is forcibly caused to take place due to the swinging movement of the wheel assembly, the tread or treads of the wheel tire or tires are obviously subjected to destructive action which necessarily results in undue and uneven wear of the tread or treads of the wheel tire or tires.

The primary object of my invention is to eliminate this objectionable lateral skidding or sliding of the tires relative to the road surface when the limited swinging movement of the wheel assembly takes place, thereby successfully eliminating the uneven wear on the tire tread or treads where constructions heretofore proposed have failed or proven to be inefficient, in addition to eliminating the destructive action on the tires because of the lateral skidding of the tires upon the road surface when the swinging movement of the wheel assembly takes place. In carrying out this general object, I propose to mount the wheel assembly upon its axle for sliding movement relative to the latter in an arcuate path concentric with a pivot point located substantially at the road surface so that no, or substantially no, lateral skidding movement of the wheel tire or tires relative to the road surface will take place when the swinging movement of the assembly occurs. While the exact location of this pivot point may vary to some extent, it will probably be found preferable to locate the same centrally between the tires of a dual wheel assembly and at a point coincident with the medial plane of the tire of a single wheel assembly.

A further object of the present invention is to provide an improved mounting of the above kind involving a novel cooperative construction whereby the axle skein on which the wheel assembly is rotatably mounted may shift in an arcuate path relative to the vehicle axle in the manner desired.

Other objects and features of the present invention will become apparent from the following description when considered in connection with the accompanying drawings, and the invention consists in the novel form, combination and arrangement of parts hereinafter more fully described, shown in said accompanying drawings and claimed.

Figure 4:
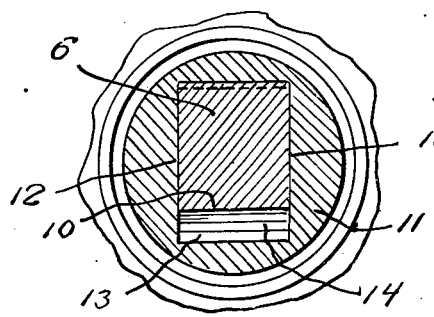
Figure 4 is a fragmentary vertical transverse section on the plane of line 4—4 of Figure 2.

Merely for purposes of illustration, I have shown the invention embodied in a dual wheel assembly. As shown, the axle 5 has an outer end portion 6 which is preferably reduced and of rectangular form in cross section from end to end and which is provided on its outer end with a reduced cylindrical stem or extension 7 whose outer terminal is threaded as at 8. The axle may be provided with an annular external shoulder 9 at the juncture of the end portion 6 with the inner portion of the axle 5, and said end portion 6 has an arcuate lower surface 10 curved upwardly and longitudinally of the axle about an axis located at a point substantially coincident with the road surface or with the plane of contact of the tire treads of the wheel assembly with the ground. This will be apparent even though the tires for the wheel assembly have not been shown mounted thereon, and the pivot point in question is also preferably located in a vertical plane occurring between the tires or the rims on which they are adapted to be mounted. Loosely surrounding the axle end 6 and the major portion of its stem or extension 7, is a skein 11 consisting of a tubular open ended body of sufficient size to provide a substantial clearance between the same and the axle, as well as adjacent parts carried by the latter. The skein 11 preferably has a rectangular bore so as to afford flat internal side walls 12 contacting the flat sides of the axle end 6 as shown more clearly in Figure 4. At the bottom, the skein 11 is provided with internal shoulders 13, near but spaced from the ends of the skein so as to form abutments for bearing shoes or blocks 14 seated in the ends of the skein 11 at the bottom of the latter. The bearing or slide blocks 14 have sloping arcuate upper surfaces conforming to the curvature of the lower surface 10 of the axle end 6 and contacting said surface 10 and a corresponding surface 15, respectively. The surface 15 constitutes a continuation of the surface 10 and is provided on the underside of a block 16 fitted on the extension or stem 7 of the axle and secured in place by a nut 17 threaded on the terminal 8 tightly against a lock washer 18 carried by the stem 7 and interposed between the block 16 and the nut 17. The bearing block 16 is thus removable and constitutes a removable extension of the end portion 6 which permits convenient manufacture and assembly, as will be apparent. In this way, the skein 11 is mounted on the end of the axle for limited swinging or tilting movement relative to the latter in a vertical plane transverse to the plane of the wheel assembly, by permitting shifting of the skein relative to the axle in an arcuate path with a sliding action.

I have shown a more or less conventional dual wheel assembly including rims 19 and 20 upon which the usual tires are adapted to be mounted, and which are carried by a hub 21 journaled at 22 by bearing assemblies upon the skein 11. The skein 11 is threaded at its outer extremity to receive the threaded lock nut 23 which retains the adjacent bearing assembly 22 in position. The hub cap 24 may be suitably retained in place upon the outer end of the hub 21. Also, the wheel assembly may embody a brake of standard or any desired design, the same being shown as including a brake drum 25, and a brake shoe carrier 26 attached to the inner end of the axle skein 11 by means including a clamping ring 27 bolted to the shoe carrier 26 and a flange 28 provided on the inner end of skein 11 as shown.

Figure 1:
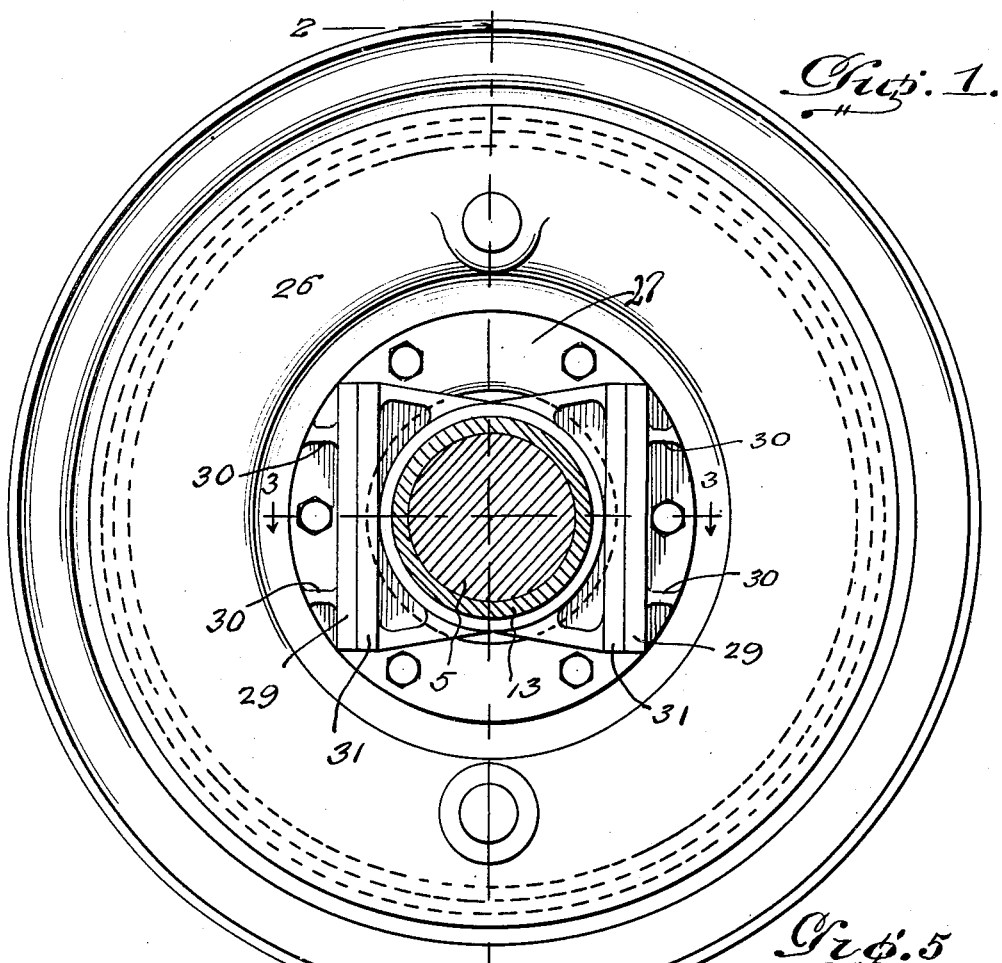
Figure 1 is a view partly in elevation and partly in transverse vertical section, of a floating wheel construction embodying the present invention; this view being one substantially looking toward the right of Figure 2.
Figures 3, 5:
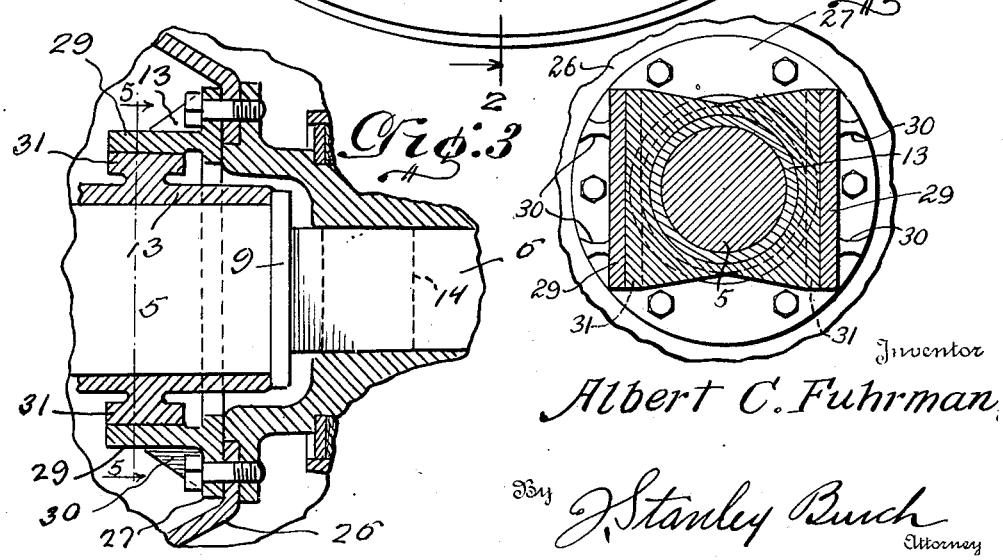
Figure 3 is a fragmentary horizontal longitudinal section taken on the plane of line 3—3 of Figure 1.
Figure 5 is a fragmentary vertical transverse section on the plane of line 5—5 of Figure 3.
Figure 2:
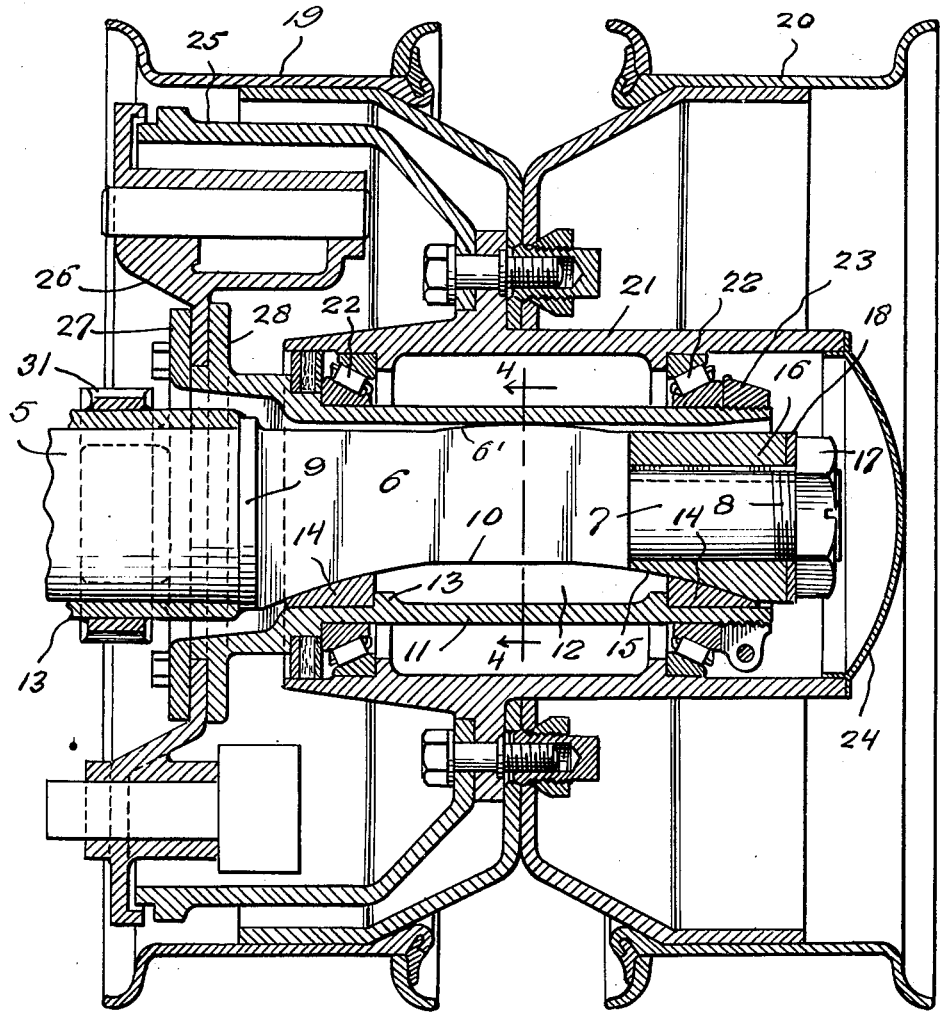
Figure 2 is a vertical longitudinal section of the wheel construction taken on line 2—2 of Figure 1.

In order to take care of brake torque, the clamping plate 27 is provided at opposite sides and adjacent opposite sides of the axle 5 with vertical guide bars 29 rigidly connected to the plate 27 as at 30, and fitted on the axle 5 inwardly of the end 6 of the latter and so as to abut the shoulder or flange 9, is an axle sleeve 13 having slide bearing bars 31 rigid with opposite sides thereof and engaging the guide bars 29. The guide bars 29 and slide bearing bars 31 have flat adjacent contacting surfaces as will clearly appear in Figures 1 and 3, so that the wheel assembly is effectively guided relative to the axle when the same tilts or swings in a vertical plane transverse to the plane of the wheel assembly with the skein 11 by reason of the mounting of the latter on the end 6 as above described.

In this way, the wheel assembly is permitted to rotate relative to the axle, although the invention may be embodied in a driven wheel adapted to rotate with the axle. It will be seen that I have provided a very compact, simple and durable construction involving a mounting having the desired operation and advantage, as well as overcoming the primary objections or disadvantages of prior devices for the same general purpose. Besides overcoming these disadvantages, the present invention successfully provides for equal load distribution on both tires of a dual wheel. The axle end portion 6 has a rounded raised portion 6' at the top and intermediate the ends thereof, which raised portion contacts the top of the skein 11 so as to prevent relative vertical movement between the axle and axle skein other than the required tilting of the latter.

What I claim as new is:

1. In combination with an axle, a wheel assembly, and bearing means mounting the wheel assembly upon the supporting axle to provide for sliding movement of the wheel assembly in an arcuate path longitudinally of the axle and about a pivot located at a point substantially coincident with the plane of contact of the wheel with the ground, whereby every point of the wheel assembly is permitted limited swinging movement in a vertical plane transverse to the plane of the assembly without lateral skidding of the wheel relative to the road surface.

2. In combination with an axle, an axle skein having a wheel assembly mounted thereon, and bearing means mounting the axle skein upon the axle to provide for longitudinal sliding movement of the skein relative to the axle in an arcuate path about a pivot coincident with the plane of contact of the wheel with the ground.

3. In combination with an axle, a wheel assembly, and bearing means mounting the wheel assembly upon the axle for longitudinal sliding movement relative to the latter in an arcuate path to provide for tilting movement of every point of the wheel assembly relative to the axle in a vertical plane transverse to the plane of the wheel assembly and about a pivot point located substantially in the plane of contact of the wheel with the road surface.

4. In combination with an axle, an axle skein, a dual wheel assembly journaled on said axle skein, and bearing means mounting said axle skein on said axle for longitudinal sliding movement relative to the latter in an arcuate path to provide for limited swinging movement of every point of the wheel assembly in a vertical plane transverse to the plane of the wheel assembly and about a pivot point located near the points of contact of the wheel with the ground.

5. A structure of the class described comprising in combination, an axle having a rectangular end portion including flat vertical side walls and an arcuate lower surface curved upwardly and longitudinally of the axle, a skein mounted upon said rectangular portion for sliding movement longitudinally of the axle in an arcuate path concentric with the arcuate lower surface of the axle end portion, said arcuate lower surface of the axle end portion being concentric with a point located in the plane of contact of the wheel with the road surface, and a wheel assembly mounted on said skein, said skein having a rectangular bore providing inner side walls cooperating with the side walls of said axle end portion and flatly contacting the latter, and the upper and lower surfaces of the axle skein providing clearance between the latter and the axle end portion to provide for tilting of every point of the wheel assembly relative to the axle in a vertical plane transverse to the plane of the wheel assembly.

6. A structure of the class described comprising in combination, an axle having a rectangular end portion including flat vertical side walls and an arcuate lower surface curved upwardly and longitudinally of the axle, a skein mounted upon said rectangular portion for sliding movement longitudinally of the axle in an arcuate path concentric with the arcuate lower surface of the axle end portion, said arcuate lower surface of the axle end portion being concentric with a point located in the plane of contact of the wheel with the road surface, a wheel assembly mounted on said skein, said skein having a rectangular bore providing inner side walls cooperating with the side walls of said axle end portion and flatly contacting the latter, and the upper and lower surfaces of the axle skein providing clearance between the latter and the axle end portion to provide for tilting of every point of the wheel assembly relative to the axle in a vertical plane transverse to the plane of the wheel assembly, an integral axial reduced threaded stem on the outer end of said axle end portion, a slide bearing block secured on said stem and having a curved lower surface forming a continuation of the lower surface of said axle end, and slide shoes carried by the axle skein and arranged within the latter adjacent the ends thereof, said shoes having arcuate upper surfaces contacting the arcuate surfaces of the axle end and bearing block.

7. A construction as defined in claim 2, in combination with a brake including a brake shoe carrier rigid with the axle skein, and slide guide means between the axle and said brake shoe carrier to oppose the torque produced by operation by the brake and permit free tilting of the axle skein and wheel assembly relative to the axle.

8. A construction as defined in claim 2, in combination with a brake including a brake shoe carrier rigid with the axle skein, slide guide means between the axle and said brake shoe carrier to oppose the torque produced by operation by the brake and permit free tilting of the axle skein and wheel assembly relative to the axle, said slide guide means comprising vertical guide bars rigid with the brake shoe carrier and arranged at opposite sides of the axle, and vertical slide bars disposed inwardly of and flat slidably engaging the inner surfaces of said guide bars and mounted upon the axle.

ALBERT C. FUHRMAN.